United States Patent
Yang

(10) Patent No.: US 9,287,913 B2
(45) Date of Patent: Mar. 15, 2016

(54) DOUBLE-MODE AND DOUBLE-STANDBY MOBILE TERMINAL AND COMMUNICATION METHOD THEREOF

(71) Applicant: ZTE Corporation, Shenzhen, Guangdong (CN)

(72) Inventor: Yun Yang, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 0 days.

(21) Appl. No.: 14/440,999

(22) PCT Filed: Jul. 4, 2013

(86) PCT No.: PCT/CN2013/078833
§ 371 (c)(1),
(2) Date: May 6, 2015

(87) PCT Pub. No.: WO2013/167019
PCT Pub. Date: Nov. 14, 2013

(65) Prior Publication Data
US 2015/0303965 A1    Oct. 22, 2015

(30) Foreign Application Priority Data
Nov. 6, 2012    (CN) .......................... 2012 1 0438478

(51) Int. Cl.
H04W 88/00    (2009.01)
H04B 1/3816   (2015.01)
(Continued)

(52) U.S. Cl.
CPC ............. *H04B 1/3816* (2013.01); *H04W 88/02* (2013.01); *H04W 88/06* (2013.01)

(58) Field of Classification Search
None
See application file for complete search history.

(56) References Cited

U.S. PATENT DOCUMENTS 8,274,938 B2* 9/2012 Chang ................... H04W 8/183
                                                    370/329
8,958,774 B2* 2/2015 Wei ......................... H04W 8/26
                                                    455/411
(Continued)

FOREIGN PATENT DOCUMENTS

CN    101068414 A    11/2007
CN    101150800 A    3/2008
(Continued)

OTHER PUBLICATIONS

International Search Report in international application No. PCT/CN2013/078833, mailed on Oct. 10, 2013.
(Continued)

*Primary Examiner* — Diane Mizrahi
(74) *Attorney, Agent, or Firm* — Oppedahl Patent Law Firm LLC

(57) ABSTRACT

A dual-mode dual-standby mobile terminal is provided, including: dual card slots configured to interpose two communication cards; a human-machine interface adapter configured to send radio frequency starting commands to dual protocol stacks, and send, after receiving radio frequency success messages fed back by the dual protocol stacks, initialization commands to dual card management modules; the dual card management modules configured to initialize the communication cards in the dual card slots according to initialization commands sent by the human-machine interface adapter, and feed back initialization success messages to the human-machine interface adapter; dual protocol stacks configured to receive the radio frequency starting commands sent by the human-machine interface adapter, start radio frequencies in the dual protocol stacks, and feed back radio frequency state information to the human-machine interface adapter. Communication protocols are provided to the communication cards in the dual card slots according to initialization results. A communication method of the dual-mode dual-standby mobile terminal is also provided. Thus, a 2G card and a 3G card can be inserted into a mobile phone in any order, and a desired network service can be provided to a user conveniently.

16 Claims, 4 Drawing Sheets

(51) Int. Cl.
*H04W 88/06* (2009.01)
*H04W 88/02* (2009.01)

(56) References Cited

U.S. PATENT DOCUMENTS

| | | | |
|---|---|---|---|
| 8,971,852 B2 * | 3/2015 | Wei | H04W 88/06 455/411 |
| 2006/0095600 A1 | 5/2006 | Lee | |
| 2008/0117874 A1 | 5/2008 | Park | |
| 2010/0304782 A1 * | 12/2010 | Chang | H04W 8/183 455/552.1 |
| 2011/0117909 A1 | 5/2011 | Cao | |
| 2011/0117944 A1 | 5/2011 | Cao | |
| 2011/0117962 A1 | 5/2011 | Qiu | |
| 2011/0117963 A1 | 5/2011 | Wang | |
| 2011/0117964 A1 | 5/2011 | Luo | |
| 2011/0117965 A1 | 5/2011 | Gong | |
| 2011/0235587 A1 | 9/2011 | Zhang | |
| 2011/0237297 A1 | 9/2011 | Shin | |
| 2013/0159535 A1 * | 6/2013 | Zhang | H04W 36/0033 709/227 |

FOREIGN PATENT DOCUMENTS

| | | |
|---|---|---|
| CN | 101150801 A | 3/2008 |
| CN | 201032743 Y | 3/2008 |
| WO | 2006073211 A1 | 7/2006 |

OTHER PUBLICATIONS

English Translation of the Written Opinion of the International Search Authority in international application No. PCT/CN2013/078833, mailed on Oct. 10, 2013.
Supplementary European Search Report in European application No. 13787630.6, mailed on Dec. 1, 2015.

* cited by examiner

DOUBLE-MODE AND DOUBLE-STANDBY MOBILE TERMINAL AND COMMUNICATION METHOD THEREOF

TECHNICAL FIELD

The present disclosure relates to a dual-mode dual-standby technology of a mobile terminal, particularly to a dual-mode dual-standby mobile terminal and a communication method thereof.

BACKGROUND

With the rapid development of modern communication technologies and increasing demands for information, mobile communication devices including mobile phones and so on have gradually become indispensable communication tools in people's daily life while subscribers, as users of mobile terminals, require better performance of the mobile terminals, thus urging the mobile terminals to be upgraded continuously. Voice and data transmission of Third Generation (3G) mobile terminals has been greatly accelerated compared with that of Second Generation (2G) mobile terminals, thus 2G mobile terminals will be replaced by 3G mobile terminals gradually. However, there are still a considerable large number of users using 2G mobile terminals, e.g. Global System for Mobile Communications (GSM) mobile terminals because a 3G network deployment is still imperfect.

With the gradual improvement of the 3G network deployment and the rapid development of Fourth Generation (4G), i.e. Long Term Evolution (LTE) networks, dual-standby mobile phones have been well-received by numerous users. A so-called dual-standby mobile phone is a mobile terminal supporting network communications of two standards, and the dual-standby mobile phone can enable a user to accept a network of a new standard while continuing the use of a network of an original standard. 2G/3G dual-mode dual-standby and 2G/3G/4G dual-mode dual-standby mobile terminals will be widely used gradually. Especially, dual-mode dual-standby mobile terminals based on a single chip will attract attention of terminal manufacturers because of their relatively low cost.

At present, 2G/3G dual-mode dual-standby mobile terminals are dominant in the market. That is, a 2G card and a 3G card may be inserted into a mobile phone simultaneously. G or T/W will be marked on a surface of a card slot of a dual-mode dual-standby mobile terminal in order to distinguish cards of two different standards, so as to prompt a user to inert a 2G card (a Subscriber Identity Module (SIM) card) into a card slot with a G mark, and a 3G card (a Universal Subscriber Identity Module (USIM) card) into a card slot with a T/W mark. A user will fail to acquire a desired network service once a card is inserted into a wrong card slot and the user needs to turn the power off again, relocate the card, and then turn the power on again to acquire the network service, which is very inconvenient.

SUMMARY

In view of this, the present disclosure provides a dual-mode dual-standby mobile terminal and a communication method thereof so as to enable a 2G card and a 3G card to be inserted into a mobile phone in any order, and provide a desired network service to a user conveniently.

To achieve the purpose, a technical solution of the present disclosure is implemented by the following way.

A dual-mode dual-standby mobile terminal includes dual card slots, a human-machine interface adapter, dual card management modules and dual protocol stacks, wherein the dual card slots are configured to interpose two communication cards;

the human-machine interface adapter is configured to send radio frequency starting commands to the dual protocol stacks, and send, after receiving radio frequency success messages fed back by the dual protocol stacks, initialization commands to the dual card management modules;

the dual card management modules are configured to initialize the two communication cards in the dual card slots according to the initialization commands sent by the human-machine interface adapter, and feed back initialization success messages to the human-machine interface adapter; and the dual protocol stacks are configured to receive the radio frequency starting commands sent by the human-machine interface adapter, start radio frequencies in the dual protocol stacks, feed back radio frequency state information to the human-machine interface adapter and provide communication protocols to the two communication cards in the dual card slots according to initialization results.

In the solution, the dual card slots may include a first card slot and a second card slot to interpose a communication card respectively.

The communication card in the first card slot and the communication card in the second card slot are cards of different standards.

In the solution, the dual card management modules may include a first card management module and a second card management module which are configured to receive the initialization commands sent by the human-machine interface adapter and initialize the two communication cards in the dual card slots respectively.

In the solution, the dual protocol stacks may include a first protocol stack and a second protocol stack, wherein the first protocol stack is configured to provide a 3G communication protocol and interact with the first card management module; and the second protocol stack is configured to provide a 2G communication protocol and interact with the second card management module.

A communication method of a dual-mode dual-standby mobile terminal includes that:

a human-machine interface adapter sends radio frequency starting commands to dual protocol stacks, and after receiving radio frequency starting success messages, sends initialization commands to dual card management modules;

the dual card management modules initialize two communication cards in dual card slots, and notify after the initialization succeeds, the dual protocol stacks to provide corresponding communication protocols to the two communication cards.

In the solution, the two communication cards may be cards of different standards.

In the solution, the initialization may include that 3G initialization is tried first, and then 2G initialization is tried if the 3G initialization fails.

In the solution, the method may further include that whether to adjust a task registry is determined according to an initialization result, corresponding communication protocols are provided to the two communication cards respectively according to the task registry.

In the solution, determining whether to adjust the task registry may include that:

when a first card management module performs 3G initialization to a communication card in a first card slot successfully, the task registry is not adjusted;

when the first card management module performs the 3G initialization to the card in the first card slot unsuccessfully, the task registry is adjusted.

In the solution, adjusting the task registry may include that the first card management module and a first protocol stack interacting with the first card management module exchange tasks with a second card management module and a second protocol stack interacting with the second card management module.

According to the dual-mode dual-standby mobile terminal and a communication method thereof provided by the present disclosure, dual card management modules and dual protocol stacks are built in the mobile terminal. The dual card management modules initialize two communication cards in dual card slots. A task registry is adjusted according to an initialization result. A 2G protocol stack in the dual protocol stacks is connected to a card slot where a 2G card locates, and a 3G protocol stack in the dual protocol stacks is connected to a card slot where a 3G card locates, thus providing a 2G protocol to the 2G card in the dual card slots, and providing a 3G protocol to the 3G card in the dual card slots. In this way, a user may insert a 2G card and a 3G card in communication card slots in any order, and acquire a desired network service conveniently.

DETAILED DESCRIPTION

Embodiments of the present disclosure will be further expounded below in combination with the accompanying drawings and specific embodiments.

Embodiment 1

Figure 1:
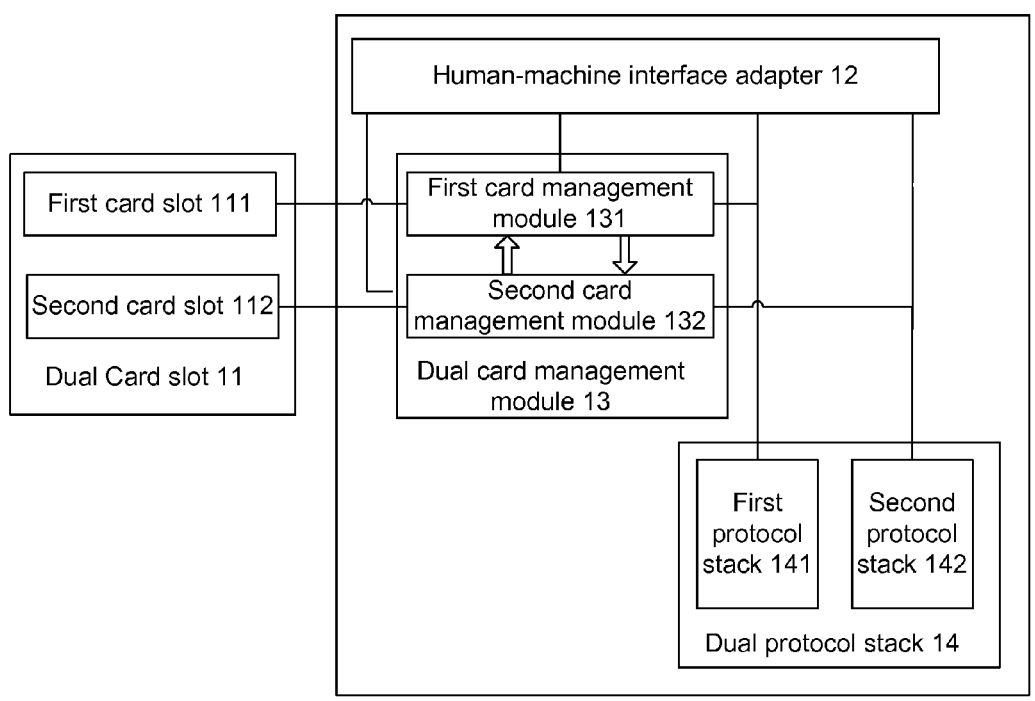
FIG. 1 is a schematic diagram of a composition structure of a dual-mode dual-standby mobile terminal in an embodiment of the present disclosure.

FIG. 1 is a schematic diagram of a composition structure of a dual-mode dual-standby mobile terminal in an embodiment of the present disclosure. As shown in FIG. 1, the mobile terminal includes dual card slots 11, a human-machine interface adapter 12, dual card management modules 13 and dual protocol stacks 14, wherein the dual card slots 11 are configured to interpose two communication cards.

Here, the two communication cards are cards of different standards, e.g. a 2G (SIM) card and a 3G (USIM) card, and the two communication cards may be inserted into the dual card slots 11 in any order.

The human-machine interface adapter 12 is configured to send radio frequency starting commands to the dual protocol stacks 14, receive radio frequency state information fed back by the dual protocol stacks 14, and send after radio frequencies are started successfully, initialization commands to the dual card management modules 13.

Here, the initialization includes initialization of two network standards, e.g. 3G initialization and 2G initialization. The 3G initialization is tried first, and the 2G initialization is tried if the 3G initialization fails.

The dual card management modules 13 are configured to initialize the communication cards in the dual card slots 11 according to the initialization commands sent by the human-machine interface adapter 12, and feed back initialization success messages to the human-machine interface adapter 12 after the initialization succeeds.

The dual protocol stacks 14 are configured to start the physical radio frequencies in the dual protocol stacks 14 according to the radio frequency starting commands sent by the human-machine interface adapter 12, and feed back the radio frequency state information to the human-machine interface adapter 12, and is further configured to provide communication protocols to the communication cards in the dual card slots 11 after the radio frequencies are started successfully.

Here, the dual card slots 11 and the dual protocol stacks 14 are connected by the dual card management modules 13. Correspondingly, the dual card management modules 13 notify, after initializing the cards in the dual card slots 11 successfully, the dual protocol stacks 14 to provide the communication protocols to the communication cards.

The dual card slots 11 include a first card slot 111 and a second card slot 112, wherein the first card slot 111 and the second card slot 112 are configured to interpose a communication card respectively.

Here, the communication card in the first card slot 111 and the communication card in the second card slot 112 are cards of different standards, e.g. a 2G (SIM) card and a 3G (USIM) card.

The two communication cards may be interposed into the dual card slots 11 in any order. Specifically, an SIM card is interposed into the first card slot 111 while a USIM card is interposed in the second card slot 112, or a USIM card is interposed in the first card slot 111 while an SIM card is interposed in the second card slot 112.

The dual card management modules 13 include a first card management module 131 and a second card management module 132, wherein the first card management module 131 and the second card management module 132 are configured to initialize the communication cards in the first card slot 111 and the second card slot 112 according to the initialization commands sent by the human-machine interface adapter 12.

Here, the cards in the first card slot 111 and the second card slot 112 are initialized in two cases, specifically as follows:

when a USIM card is interposed into the first card slot 111 while an SIM card is interposed in the second card slot 112, the first card management module 131 initializes the card in the first card slot 111, specifically, 3G initialization is tried first, and if the 3G initialization succeeds as a result, then the first card management module 131 sends a card initialization success message to the human-machine interface adapter 12; the human-machine interface adapter 12 sends a card initialization command to the second card management module 132, the second card management module 132 initializes the card in the second card slot 112, specifically, 3G initialization is tried first, and if the 3G initialization fails as a result, then 2G initialization is tried, and if the 2G initialization succeeds as a result, then an initialization success message is fed back to the human-machine interface adapter 12;

when an SIM card is interposed into the first card slot 111 and a USIM card is interposed into the second card slot 112, the first card management module 131 initializes the card in the first card slot 111, specifically, 3G initialization is tried first, and if the 3G initialization fails as a result, then the first card management module 131 and the second card management module 132 are exchanged; here, the first card management module and the second card management module are exchanged through modifying a task registry; the second card management module 132 continues to perform 2G initialization to the card in the first card slot 111 and if the 2G initialization succeeds as a result, then the second card management module 132 sends a card initialization success message to the human-machine interface adapter 12; the human-machine interface adapter 12 sends a card initialization command to the first card management module 131, and the first card management module 131 initializes the card in the second card slot 112; specifically, 3G initialization is tried first, and if the 3G initialization succeeds as a result, then an initialization success message is fed back to the human-machine interface adapter 12.

The dual protocol stacks 14 include a first protocol stack 141 and a second protocol stack 142, wherein the first protocol stack 141 and the second protocol stack 142 are configured to send the radio frequency starting commands to the human-machine interface adapter 12 to start the physical radio frequencies of the first protocol stack 141 and the second protocol stack 142, and feed back the radio frequency state information to the human-machine interface adapter 12, and is further configured to, after the radio frequencies are started successfully, provide a 3G communication protocol and a 2G communication protocol to the communication cards in the dual card slots 11 respectively.

Here, the first protocol stack 141 provides the 3G communication protocol and is connected to the first card management module 131, wherein the first card management module 131 initializes the card in the card slots 11. When 3G initialization succeeds, the first card management module notifies the first protocol stack to provide the 3G communication protocol to the card in the card slots 11.

The second protocol stack 142 provides the 2G communication protocol and is connected to the second card management module 132, wherein the second card management module 132 initializes the card in the card slots 11. When 2G initialization succeeds, the second card management module notifies the second protocol stack to provide the 2G communication protocol to the card in the card slots 11.

Correspondingly, the dual protocol stacks 14 provide the communication protocols for initialization in the following two cases:

when 3G initialization is performed to the card in the first card slot successfully and 2G initialization is performed to the card in the second card slot successfully, the first protocol stack provides the 3G communication protocol to the card in the first card slot, and the second protocol stack provides the 2G communication protocol to the card in the second card slot;

when 2G initialization is performed to the card in the first card slot successfully and 3G initialization is performed to the card in the second card slot successfully, the second protocol stack provides the 2G communication protocol to the card in the first card slot and the first protocol stack provides the 3G communication protocol to the card in the second card slot.

Embodiment 2

Figure 2:
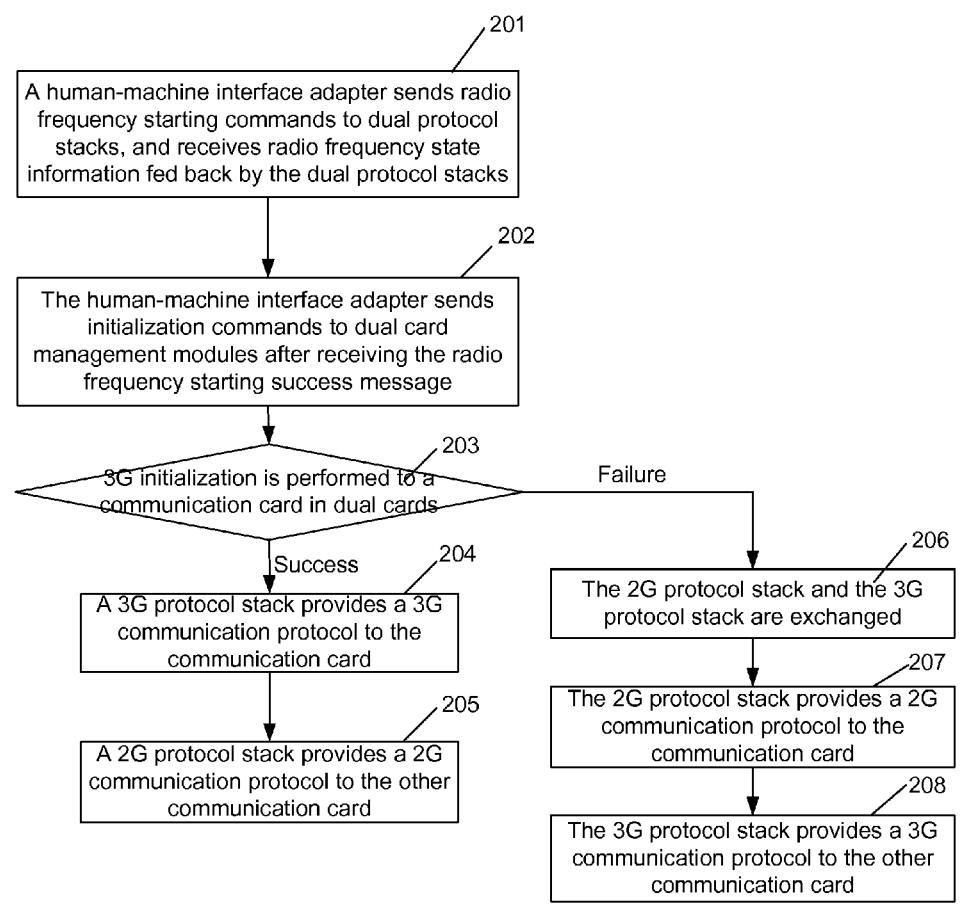
FIG. 2 is a schematic diagram of an implementation process of a communication method of a dual-mode dual-standby mobile terminal in an embodiment of the present disclosure.

FIG. 2 is a schematic diagram of an implementation process of a communication method of a dual-mode dual-standby mobile terminal in an embodiment of the present disclosure. As shown in FIG. 2, the process includes the following steps 201-208.

Step 201 includes that a human-machine interface adapter sends radio frequency starting commands to dual protocol stacks, and receives radio frequency state information fed back by the dual protocol stacks.

Here, the radio frequency starting commands are sent to the two protocol stacks simultaneously.

The fed-back radio frequency state information is radio frequency starting success or radio frequency starting failure information. Specifically, when the two protocol stacks start radio frequencies successfully at the same time, the radio frequency starting success information is fed back, otherwise, the radio frequency starting failure information is fed back.

Step 202 includes that the human-machine interface adapter sends initialization commands to dual card management modules after receiving radio frequency starting success messages.

Here, the initialization includes 3G initialization and 2G initialization. The 3G initialization is tried first, and the 2G initialization is tried when the 3G initialization fails.

Step 203 includes that 3G initialization is performed to a communication card of the dual cards. If the initialization succeeds, Step 204 is performed. Otherwise, Step 206 is performed.

Here, when the initialized communication card is a 3G (USIM) card, it is considered that the initialization succeeds. When the initialized communication card is a 2G (SIM) card, it is considered that the initialization fails.

Step 204 includes that a 3G protocol stack provides a 3G communication protocol to the communication card.

Before Step 204, there is a step that corresponding card management module sends an initialization success message to the 3G protocol stack.

Step 205 includes that a 2G protocol stack provides a 2G communication protocol to the other communication card, and the current process is terminated.

Before Step 205, the process further includes a step that corresponding card management module initializes the other communication card, and if 2G initialization succeeds as a result, then the mobile terminal sends an initialization success message to the 2G protocol stack.

Here, the initialization specifically includes: 3G initialization is performed to the communication card first, and if the 3G initialization fails as a result, then 2G initialization is performed to the communication card subsequently, and the 2G initialization succeeds as a result.

When the communication card is a 2G (USIM) card, it is considered that the initialization succeeds. When the communication card is a 3G (SIM) card, it is considered that the initialization fails.

Step 206 includes that the 2G protocol stack and the 3G protocol stack are exchanged.

Here, the exchanging is implemented through modifying a task registry.

Step 207 includes that the 2G protocol stack provides a 2G communication protocol to the communication card.

Before Step 207, the process further includes a step that corresponding card management module continues to initialize the communication card, and if 2G initialization succeeds as a result, then the corresponding card management module sends an initialization success message to the 2G protocol stack.

Here, the initialization specifically includes that 3G initialization is performed to the communication card first, and if the 3G initialization fails as a result, then 2G initialization is performed to the communication card and the 2G initialization succeeds as a result.

When the initialized communication card is a 2G (SIM) card, it is considered that the initialization succeeds. When the initialized communication card is a 3G (USIM) card, it is considered that the initialization fails.

Step 208 includes that the 3G protocol stack provides a 3G communication protocol to the other communication card.

Before Step 208, the process further includes a step that corresponding card management module initializes the other communication card, and if 3G initialization succeeds as a result, then the corresponding card management module sends an initialization success message to the 3G protocol stack.

When the other initialized communication card is a 3G (USIM) card, it is considered that the initialization succeeds. When the other initialized communication card is a 2G (SIM) card, it is considered that the initialization fails.

Embodiment 3

Figure 3:
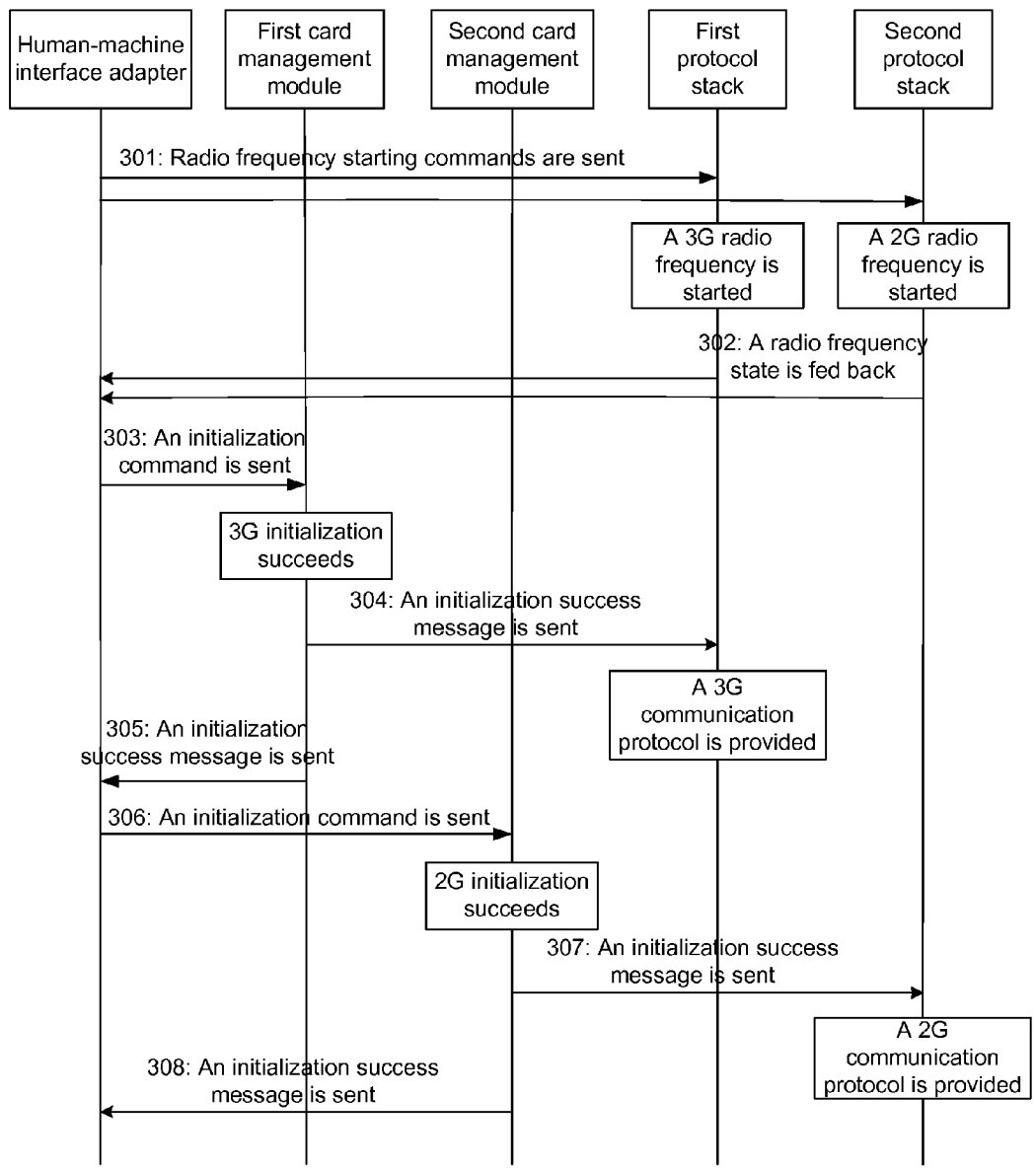
FIG. 3 is a schematic diagram of an implementation process of a dual-mode dual-standby mobile terminal without dynamic adjustment in an embodiment of the present disclosure.

FIG. 3 is a schematic diagram of an implementation process of a dual-mode dual-standby mobile terminal without dynamic adjustment in an embodiment of the present disclosure. As shown in FIG. 3, the process includes the following steps 301 to 308.

Step 301 to Step 302 includes that a human-machine interface adapter sends radio frequency starting commands to a first protocol stack and a second protocol stack, and receives radio frequency state information fed back by the two protocol stacks.

After sending the radio frequency starting commands, the present step further includes that the first protocol stack starts a 3G radio frequency and the second protocol stack starts a 2G radio frequency.

Here, the radio frequency state information fed back by the two protocol stacks is radio frequency starting success or radio frequency starting failure information. Specifically, when the first protocol stack and the second protocol stack start the radio frequencies successfully at the same time, the radio frequency starting success information is fed back, otherwise, the radio frequency starting failure information is fed back.

Step 303 includes that after receiving a radio frequency starting success message, the human-machine interface adapter sends an initialization command to a first card management module.

The present step further includes that the first card management module initializes a card in a first card slot, and 3G initialization succeeds as a result.

Here, the initialization includes 3G initialization and 2G initialization. 3G initialization is tried first, and 2G initialization is tried if the 3G initialization fails.

Here, the card in the first card slot is a 3G (USIM) card. Correspondingly, 3G initialization is performed to the card successfully.

Step 304 includes that the first card management module sends an initialization success message to the first protocol stack, and the first protocol stack provides a 3G communication protocol to the card in the first card slot.

Step 305 to Step 306 include that the first card management module sends an initialization success message to the human-machine interface adapter. After receiving the initialization success message, the human-machine interface adapter sends an initialization command to a second card management module.

The present step further includes that the second card management module initializes a card in a second card slot, and 2G initialization succeeds as a result.

Here, the initialization includes 3G initialization and 2G initialization. 3G initialization is tried first, and 2G initialization is tried if the 3G initialization fails.

Here, the card in the second card slot is a 2G (SIM) card, and 2G initialization is performed to the card successfully.

Step 307 to Step 308 include that the second card management module sends an initialization success message to the second protocol stack, and the second protocol stack provides a 2G communication protocol to the card in the second card slot.

The present step further includes that the second card management module sends an initialization success message to the human-machine interface adapter.

Embodiment 4

Figure 4:
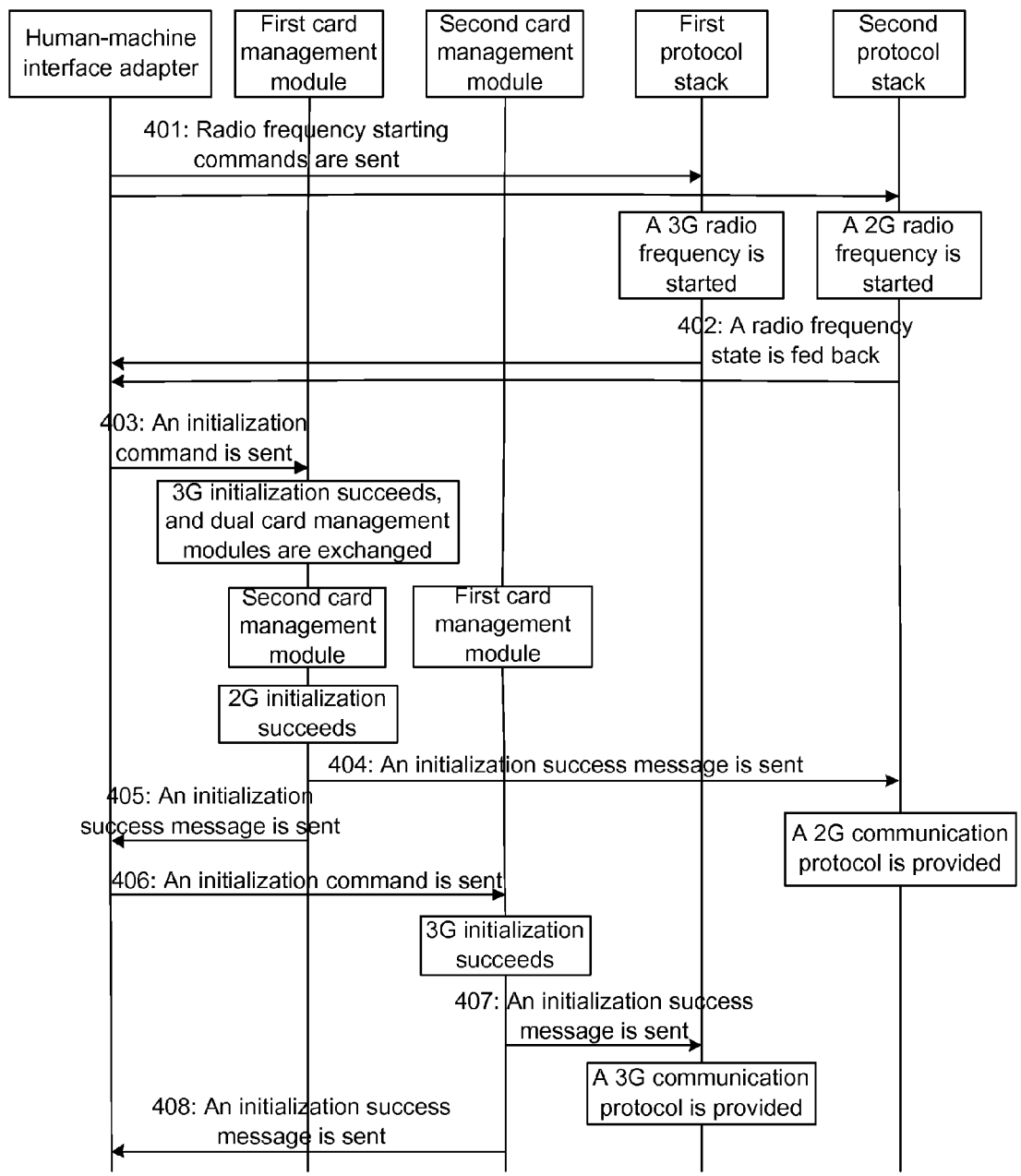
FIG. 4 is a schematic diagram of an implementation process of a dual-mode dual-standby mobile terminal with dynamic adjustment in an embodiment of the present disclosure.

FIG. 4 is a schematic diagram of an implementation process of a dual-mode dual-standby mobile terminal with dynamic adjustment in an embodiment of the present disclosure. As shown in FIG. 4, the process includes the following steps 401-408.

Step 401 to Step 402 include that a human-machine interface adapter sends radio frequency starting commands to a first protocol stack and a second protocol stack and receives radio frequency state information fed back by the two protocol stacks.

After sending the radio frequency starting commands, the present step further includes that the first protocol stack starts a 3G radio frequency and the second protocol stack starts a 2G radio frequency.

Here, the radio frequency state information fed back by the two protocol stacks is radio frequency starting success or radio frequency starting failure information. Specifically, when the first protocol stack and the second protocol stack start the radio frequencies successfully at the same time, the radio frequency starting success information is fed back, otherwise, the radio frequency starting failure information is fed back.

Step 403 includes that after receiving a radio frequency starting success message, the human-machine interface adapter sends an initialization command to a first card management module.

Here, the initialization includes 3G initialization and 2G initialization. 3G initialization is tried first, and 2G initialization is tried if the 3G initialization fails.

Correspondingly, the present step further includes that the first card management module performs 3G initialization to a card in a first card slot. Here, the card in the first card slot is a 2G (SIM) card, and 3G initialization fails as a result. The first card management module and a second card management module are exchanged. Here, the first card management module and the second card management module are exchanged through modifying a task registry. The second card management module continues to perform 2G initialization to the card in the first card slot, and 2G initialization succeeds as a result.

Step 404 includes that the second card management module sends an initialization success message to the second protocol stack, and the second protocol stack provides a 2G communication protocol to the card in the first card slot.

Step 405 to Step 406 include that the second card management module sends an initialization success message to the human-machine interface adapter. After receiving the initialization success message, the human-machine interface adapter sends an initialization command to the first card management module.

The step further includes that the first card management module performs 3G initialization to a card in a second card slot, and 3G initialization succeeds as a result.

The initialization includes 3G initialization and 2G initialization. 3G initialization is tried first, and 2G initialization is tried if the 3G initialization fails.

Here, the card in the second card slot is a 3G (USIM) card. Correspondingly, the 3G initialization is performed to the card successfully.

Step 407 to Step 408 include that the first card management module sends an initialization success message to the first protocol stack and the first protocol stack provides a 3G communication protocol to the card in the second card slot.

The present step further includes that the second card management module sends an initialization success message to the human-machine interface adapter.

The foregoing descriptions are only preferred embodiments of the present disclosure and are not used for limiting the protection scope of the present disclosure.

INDUSTRIAL APPLICABILITY

In the present disclosure, dual card management modules and dual protocol stacks are built in a mobile terminal. The dual card management modules initialize two communication cards in dual card slots. A task registry is adjusted according to initialization results. A 2G protocol stack in the dual protocol stacks is connected to a card slot where a 2G card locates, and a 3G protocol stack in the dual protocol stacks is connected to a card slot where a 3G card locates, thus providing a 2G protocol to the 2G card in the dual card slots, and providing a 3G protocol to the 3G card in the dual card slots. In this way, a user may insert a 2G card and a 3G card in communication card slots in any order, and acquire a desired network service conveniently.

What is claimed is:

1. A dual-mode dual-standby mobile terminal, comprising dual card slots, a human-machine interface adapter, dual card management modules and dual protocol stacks, wherein
the dual card slots are configured to interpose two communication cards;
the human-machine interface adapter is configured to send radio frequency starting commands to the dual protocol stacks, and send, after receiving radio frequency success messages fed back by the dual protocol stacks, initialization commands to the dual card management modules;
the dual card management modules are configured to initialize the two communication cards in the dual card slots according to the initialization commands sent by the human-machine interface adapter, and feed back initialization success messages to the human-machine interface adapter; and
the dual protocol stacks are configured to receive the radio frequency starting commands sent by the human-machine interface adapter, start radio frequencies in the dual protocol stacks, feed back radio frequency state information to the human-machine interface adapter and provide communication protocols to the two communication cards in the dual card slots according to initialization results.

2. The dual-mode dual-standby mobile terminal according to claim 1, wherein the dual card slots include a first card slot and a second card slot to interpose a communication card respectively;
the communication card in the first card slot and the communication card in the second card slot are cards of different standards.

3. The dual-mode dual-standby mobile terminal according to claim 1, wherein the dual card management modules include a first card management module and a second card management module which are configured to receive the initialization commands sent by the human-machine interface adapter and initialize the two communication cards in the dual card slots respectively.

4. The dual-mode dual-standby mobile terminal according to claim 3, wherein the dual protocol stacks include a first protocol stack and a second protocol stack, wherein
the first protocol stack is configured to provide a Third Generation (3G) communication protocol and interact with the first card management module; and
the second protocol stack is configured to provide a Second Generation (2G) communication protocol and interact with the second card management module.

5. A communication method of a dual-mode dual-standby mobile terminal, comprising:
sending, by a human-machine interface adapter, radio frequency starting commands to dual protocol stacks;
sending, by the human-machine interface adapter, initialization commands to dual card management modules after receiving radio frequency starting success messages;
initializing, by the dual card management modules, two communication cards in dual card slots, and notifying, by the dual card management modules after the initialization succeeds, the dual protocol stacks to provide corresponding communication protocols to the two communication cards.

6. The communication method according to claim 5, wherein the two communication cards are cards of different standards.

7. The communication method according to claim 5, wherein the initialization comprises: trying Third Generation (3G) initialization first, and then trying Second Generation (2G) initialization if the 3G initialization fails.

8. The communication method according to claim 5, further comprising: determining whether to adjust a task registry according to an initialization result, and providing corresponding communication protocols to the two communication cards respectively according to the task registry.

9. The communication method according to claim 8, wherein determining whether to adjust the task registry comprises:
when a first card management module performs 3G initialization to a communication card in a first card slot successfully, not adjusting the task registry;
when the first card management module performs the 3G initialization to the communication card in the first card slot unsuccessfully, adjusting the task registry.

10. The communication method according to claim 9, wherein adjusting the task registry comprises: exchanging, by the first card management module and a first protocol stack interacting with the first card management module, tasks with a second card management module and a second protocol stack interacting with the second card management module.

11. The dual-mode dual-standby mobile terminal according to claim 2, wherein the dual card management modules include a first card management module and a second card management module which are configured to receive the initialization commands sent by the human-machine interface adapter and initialize the two communication cards in the dual card slots respectively.

12. The dual-mode dual-standby mobile terminal according to claim 11, wherein the dual protocol stacks include a first protocol stack and a second protocol stack, wherein
the first protocol stack is configured to provide a Third Generation (3G) communication protocol and interact with the first card management module; and
the second protocol stack is configured to provide a Second Generation (2G) communication protocol and interact with the second card management module.

13. The communication method according to claim 6, further comprising: determining whether to adjust a task registry according to an initialization result, and providing corresponding communication protocols to the two communication cards respectively according to the task registry.

14. The communication method according to claim 7, further comprising: determining whether to adjust a task registry according to an initialization result, and providing corresponding communication protocols to the two communication cards respectively according to the task registry.

15. The communication method according to claim 13, wherein determining whether to adjust the task registry comprises:
when a first card management module performs 3G initialization to a communication card in a first card slot successfully, not adjusting the task registry;
when the first card management module performs the 3G initialization to the communication card in the first card slot unsuccessfully, adjusting the task registry.

16. The communication method according to claim 14, wherein determining whether to adjust the task registry comprises:
when a first card management module performs 3G initialization to a communication card in a first card slot successfully, not adjusting the task registry;
when the first card management module performs the 3G initialization to the communication card in the first card slot unsuccessfully, adjusting the task registry.

* * * * *